United States Patent
Sato et al.

(10) Patent No.: US 12,480,017 B2
(45) Date of Patent: Nov. 25, 2025

(54) PRETREATMENT LIQUID FOR INK JET INK, INK SET, IMAGE RECORDING METHOD, METHOD OF PRODUCING LAMINATE, IMAGE RECORDED MATERIAL, AND LAMINATE

(71) Applicant: FUJIFILM Corporation, Tokyo (JP)

(72) Inventors: Ayato Sato, Kanagawa (JP); Shinichiro Sekine, Kanagawa (JP); Yuuta Fujino, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/795,609

(22) Filed: Aug. 6, 2024

(65) Prior Publication Data

US 2024/0392151 A1  Nov. 28, 2024

Related U.S. Application Data

(63) Continuation of application No. PCT/JP2023/002504, filed on Jan. 26, 2023.

(30) Foreign Application Priority Data

Feb. 14, 2022 (JP) .................... 2022-020630

(51) Int. Cl.
| | |
|---|---|
| C09D 11/54 | (2014.01) |
| B41J 2/01 | (2006.01) |
| B41M 5/00 | (2006.01) |
| B41M 7/00 | (2006.01) |
| C09D 11/102 | (2014.01) |
| C09D 11/38 | (2014.01) |
| C09D 11/40 | (2014.01) |

(52) U.S. Cl.
CPC .............. *C09D 11/54* (2013.01); *B41J 2/01* (2013.01); *B41M 5/0017* (2013.01); *B41M 7/0027* (2013.01); *C09D 11/102* (2013.01); *C09D 11/38* (2013.01); *C09D 11/40* (2013.01)

(58) Field of Classification Search
CPC ....... C09D 11/54; C09D 11/102; C09D 11/38; C09D 11/40; B41M 5/0017; B41M 7/0027; B41J 2/01
USPC .................................. 428/195.1
See application file for complete search history.

(56) References Cited

U.S. PATENT DOCUMENTS

| | | | |
|---|---|---|---|
| 2009/0082518 A1* | 3/2009 | Uchida ............. | C09D 11/106 528/65 |
| 2012/0127251 A1 | 5/2012 | Tsuji et al. | |
| 2018/0265728 A1 | 9/2018 | Hanazawa et al. | |
| 2019/0031897 A1 | 1/2019 | Hirade et al. | |
| 2020/0399496 A1* | 12/2020 | Nonaka ............. | C09D 11/40 |
| 2021/0371687 A1 | 12/2021 | Ishida | |
| 2024/0392151 A1* | 11/2024 | Sato ................. | B41M 7/0027 |

FOREIGN PATENT DOCUMENTS

| | | |
|---|---|---|
| JP | 2012-126123 A | 7/2012 |
| JP | 2018-154118 A | 10/2018 |
| JP | 2021-000790 A | 1/2021 |
| JP | 2021-187095 A | 12/2021 |

OTHER PUBLICATIONS

International Search Report dated Mar. 28, 2023, issued in International Application No. PCT/JP2023/002504.
Written Opinion dated Mar. 28, 2023, issued in International Application No. PCT/JP2023/002504.
International Preliminary Report on Patentability (with translation of Written Opinion) dated Aug. 20, 2024, issued in International Application No. PCT/JP2023/002504.
Extended European Search Report issued Jul. 14, 2025 in European Application No. 23752695.9.

* cited by examiner

*Primary Examiner* — Betelhem Shewareged
(74) *Attorney, Agent, or Firm* — Sughrue Mion, PLLC

(57) ABSTRACT

Provided are a pretreatment liquid for an ink jet ink, including at least one aggregating agent selected from the group consisting of an organic acid, a polyvalent metal compound, and a metal complex, water, and a urethane resin, in which the urethane resin has a polyol unit, a polyisocyanate unit, and a polyalkylene glycol monoalkyl ether unit, and an application thereof.

19 Claims, No Drawings

PRETREATMENT LIQUID FOR INK JET INK, INK SET, IMAGE RECORDING METHOD, METHOD OF PRODUCING LAMINATE, IMAGE RECORDED MATERIAL, AND LAMINATE

CROSS-REFERENCE TO RELATED APPLICATIONS

This application is a continuation of International Application No. PCT/JP2023/002504, filed on Jan. 26, 2023, which claims priority from Japanese Patent Application No. 2022-020630, filed on Feb. 14, 2022. The entire disclosure of each of the above applications is incorporated herein by reference.

BACKGROUND OF THE INVENTION

1. Field of the Invention

The present disclosure relates to a pretreatment liquid for an ink jet ink, an ink set, an image recording method, a method of producing a laminate, an image recorded material, and a laminate.

2. Description of the Related Art

In the related art, various examinations have been conducted on an image recording method carried out using a pretreatment liquid and an ink.

For example, JP2018-154118A describes, as a printing method (that is, an image recording method) that enables formation of an image with excellent rub resistance, a printing method including a treatment liquid applying step of applying a treatment liquid onto a recording medium and an ink applying step of applying an ink onto the recording medium, in which the treatment liquid contains a nonionic resin having a urethane bond, the nonionic resin has a glass transition temperature of 15° C. or lower, and the ink contains a nonionic resin having a urethane bond and a coloring material.

SUMMARY OF THE INVENTION

A laminate is produced by applying a pretreatment liquid for an ink jet ink and an ink jet ink in this order onto an impermeable base material to record an image so that an image recorded material is obtained and laminating a base material for lamination on the image in the obtained image recorded material. This laminate is required to have boiling resistance (that is, resistance to a boiling treatment) in some cases.

In addition, the pretreatment liquid for an ink jet ink is required to have storage stability in some cases.

An object to be achieved by an embodiment of the present disclosure is to provide a pretreatment liquid for an ink jet ink, which has excellent storage stability and is capable of improving the boiling resistance of a laminate in a case where a laminate is produced by applying a pretreatment liquid for an ink jet ink and an ink jet ink in this order onto an impermeable base material to record an image so that an image recorded material is obtained and laminating a base material for lamination on the image in the obtained image recorded material.

An object to be achieved by another embodiment of the present disclosure is to provide an ink set including the pretreatment liquid for an ink jet ink, and an ink set, an image recording method, a method of producing a laminate, an image recorded material, and a laminate, using the pretreatment liquid for an ink jet ink.

The present disclosure includes the following aspects.

<1> A pretreatment liquid for an ink jet ink, comprising: at least one aggregating agent selected from the group consisting of an organic acid, a polyvalent metal compound, and a metal complex; water; and a urethane resin, in which the urethane resin has a polyol unit, a polyisocyanate unit, and a polyalkylene glycol monoalkyl ether unit.

<2> The pretreatment liquid for an ink jet ink according to <1>, in which in a case where a number average molecular weight of polyalkylene glycol monoalkyl ether for forming the polyalkylene glycol monoalkyl ether unit is defined as a and a number average molecular weight of the urethane resin is defined as b, $(a/b) \times 100$ is in a range of 2.5 to 20.0.

<3> The pretreatment liquid for an ink jet ink according to <1> or <2>, in which a content of the polyalkylene glycol monoalkyl ether unit is in a range of 5% by mass to 20% by mass with respect to a total amount of the urethane resin.

<4> The pretreatment liquid for an ink jet ink according to any one of <1> to <3>, in which the polyol unit includes a polycarbonate diol unit.

<5> The pretreatment liquid for an ink jet ink according to any one of <1> to <4>, in which the aggregating agent includes at least one selected from the group consisting of the organic acid and an organic acid polyvalent metal salt as the polyvalent metal compound.

<6> The pretreatment liquid for an ink jet ink according to any one of <1> to <5>, in which the aggregating agent includes the organic acid.

<7> An ink set comprising: the pretreatment liquid for an ink jet ink according to any one of <1> to <6>; and a first ink which is an ink jet ink containing water and a urethane resin.

<8> The ink set according to <7>, in which the first ink further contains a white pigment.

<9> The ink set according to <8>, further comprising: a second ink which is an ink jet ink containing water, a color pigment, and a urethane resin.

<10> An image recording method using the ink set according to <7> or <8>, the method comprising: a step of applying the pretreatment liquid for an ink jet ink onto an impermeable base material; and a step of applying the first ink onto the impermeable base material onto which the pretreatment liquid for an ink jet ink has been applied, using an ink jet recording method.

<11> An image recording method using the ink set according to <9>, the method comprising: a step of applying the pretreatment liquid for an ink jet ink onto an impermeable base material; and a step of applying the first ink and the second ink onto the impermeable base material onto which the pretreatment liquid for an ink jet ink has been applied, using an ink jet recording method.

<12> A method of producing a laminate, comprising: a step of obtaining an image recorded material that includes the impermeable base material and an image disposed on the impermeable base material by the image recording method according to <10> or <11>; and a step of laminating a base material for lamination on a side of the image recorded material where the image is disposed to obtain a laminate.

<13> An image recorded material comprising: an impermeable base material; and an image disposed on the impermeable base material, in which the image includes a pretreatment layer disposed on the impermeable base material and containing at least one aggregating agent selected from the group consisting of an organic acid, a polyvalent metal compound, and a metal complex, and a urethane resin, and an ink layer disposed on the pretreatment layer and containing a pigment and a urethane resin, and the urethane resin in the pretreatment layer includes a polyol unit, a polyisocyanate unit, and a polyalkylene glycol monoalkyl ether unit.

<14> A laminate comprising: the image recorded material according to <13>; and a base material for lamination which is laminated on the image of the image recorded material.

According to an embodiment of the present disclosure, it is possible to provide a pretreatment liquid for an ink jet ink, which has excellent storage stability and is capable of improving the boiling resistance of a laminate in a case where a laminate is produced by applying a pretreatment liquid for an ink jet ink and an ink jet ink in this order onto an impermeable base material to record an image so that an image recorded material is obtained and laminating a base material for lamination on the image in the obtained image recorded material.

According to another embodiment of the present disclosure, it is possible to provide an ink set including the pretreatment liquid for an ink jet ink, and an ink set, an image recording method, a method of producing a laminate, an image recorded material, and a laminate, using the pretreatment liquid for an ink jet ink.

DESCRIPTION OF THE PREFERRED EMBODIMENTS

Hereinafter, an ink jet ink set for an impermeable base material, an image recording method, a method of producing a laminate, an image recorded material, and a laminate according to the present disclosure will be described in detail.

In the present specification, a numerical range shown using "to" indicates a range including the numerical values described before and after "to" as a minimum value and a maximum value, respectively.

In a numerical range described in a stepwise manner in the present specification, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present specification, a combination of two or more preferred embodiments is a more preferred embodiment.

In the present disclosure, the meaning of the term "step" includes not only an independent step but also a step whose intended purpose is achieved even in a case where the step is not clearly distinguished from other steps.

In the present specification, the term "image" denotes an entire film formed by applying a pretreatment liquid and an ink in this order, and the term "image recording" denotes formation of an image (that is, the film).

Further, the concept of "image" in the present specification also includes a solid image.

In the present specification, the concept of "(meth)acrylate" includes both acrylate and methacrylate. In addition, the concept "(meth)acryl" includes both acryl and methacryl.

In the present specification, the term "boiling treatment" denotes a treatment of immersing an object (specifically, a laminate) in water at 60° C. to 100° C. and heating the object for a certain time (for example, 10 minutes to 120 minutes).

[Pretreatment Liquid for Ink Jet Ink]

A pretreatment liquid for an ink jet ink according to the present disclosure (hereinafter, also simply referred to as "pretreatment liquid") contains at least one aggregating agent selected from the group consisting of an organic acid, a polyvalent metal compound, and a metal complex, water, and a urethane resin, in which the urethane resin has a polyol unit, a polyisocyanate unit, and a polyalkylene glycol monoalkyl ether unit.

According to the pretreatment liquid of the present disclosure, the boiling resistance of a laminate in a case where a laminate is produced by applying the pretreatment liquid and the ink jet ink (hereinafter, also simply referred to as "ink") in this order onto an impermeable base material to record an image so that an image recorded material is obtained and laminating a base material for lamination on the image in the obtained image recorded material can be improved. Further, the pretreatment liquid of the present disclosure has excellent storage stability.

The reason why the effect of improving the boiling resistance of the laminate described above can be obtained is considered to be that the flexibility of the layer derived from the pretreatment liquid and the adhesiveness to the impermeable base material are improved because the pretreatment liquid contains a urethane resin.

Further, it is considered that the combination of the aggregating agent and the polyalkylene glycol monoalkyl ether unit in the urethane resin also contributes to the effect of improving the boiling resistance of the laminate described above.

Specifically, it is considered that the compatibility between the layer derived from the pretreatment liquid and the layer derived from the ink on the impermeable base material is improved due to the action of the combination of the aggregating agent in the pretreatment liquid and the alkylene glycol monoalkyl ether unit contained in the urethane resin in the pretreatment liquid, and as a result, the boiling resistance of the laminate is improved. Further, it is considered that the effect of improving the flexibility of the urethane resin and the adhesiveness to the impermeable base material also contributes to the improvement of the boiling resistance of the laminate.

In general, the aggregating agent in the pretreatment liquid can act to decrease the dispersibility of the resin. However, in the pretreatment liquid of the present disclosure, the dispersibility of the urethane resin is satisfactorily maintained due to the action of the alkylene glycol monoalkyl ether unit contained in the urethane resin in the pretreatment liquid. As a result, it is considered that the pretreatment liquid of the present disclosure is a pretreatment liquid containing an aggregating agent and a resin and has excellent storage stability.

Hereinafter, each component that can be contained in the pretreatment liquid will be described.

<Water>

The pretreatment liquid of the present disclosure contains water.

The content of water is preferably 50% by mass or greater and more preferably 60% by mass or greater with respect to the total amount of the pretreatment liquid.

The upper limit of the content of water depends on the amount of other components, but is preferably 90% by mass or less and more preferably 80% by mass or less with respect to the total amount of the pretreatment liquid.

<Aggregating Agent>

The pretreatment liquid according to the present disclosure contains at least one aggregating agent selected from the group consisting of an organic acid, a polyvalent metal compound, and a metal complex.

As described above, the aggregating agent contributes to the improvement of the boiling resistance of the laminate.

Preferred examples of the aggregating agent also include the aggregating agents described in paragraphs 0122 to 0130 of WO2020/195360A.

Hereinafter, preferable aspects of each of the organic acid, the polyvalent metal compound, and the metal complex, which can be used as the aggregating agent, will be described.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0). In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

—Polyvalent Metal Compound—

Examples of the polyvalent metal compound include a polyvalent metal salt.

Examples of the polyvalent metal salt include an organic acid polyvalent metal salt and an inorganic acid polyvalent metal salt.

A polyvalent metal salt of the organic acid (for example, formic acid, acetic acid, or benzoic acid) described above is preferable as the organic acid polyvalent metal salt.

As the inorganic acid polyvalent metal salt, a nitric acid polyvalent metal salt, a hydrochloric acid polyvalent metal salt, or a thiocyanic acid polyvalent metal salt is preferable.

Examples of the polyvalent metal salt include salts of alkaline earth metals of a group 2 (such as magnesium and calcium) in the periodic table, salts of transition metals of a group 3 (such as lanthanum) in the periodic table, salts of metals of a group 13 (such as aluminum) in the periodic table, and salts of lanthanides (such as neodymium).

As the polyvalent metal salt, a calcium salt, a magnesium salt, or an aluminum salt is preferable, and a calcium salt or a magnesium salt is more preferable.

As the polyvalent metal compound, an organic acid polyvalent metal salt is preferable, and an organic acid calcium salt or an organic acid magnesium salt is more preferable.

Further, it is preferable that at least a part of the polyvalent metal compound is dissociated into polyvalent metal ions and counterions in the pretreatment liquid.

—Metal Complex—

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable as the metal complex.

—Cationic Polymer—

The pretreatment liquid of the present disclosure may further contain a cationic polymer as an aggregating agent.

It is preferable that the cationic polymer is a homopolymer of a cationic monomer containing a primary to tertiary amino group or a quaternary ammonium base, or a copolymer or a condensed polymer of a cationic monomer and a non-cationic monomer. The cationic polymer may be used in any form of a water-soluble polymer or a water-insoluble polymer (that is, latex particles).

Examples of the cationic polymer include a polyvinylpyridine salt, polyalkylaminoethyl acrylate, polyalkylaminoethyl methacrylate, polyvinylimidazole, polyethyleneimine, polybiguanide, polyguanide, polyallylamine, and derivatives thereof.

From the viewpoint of the viscosity of the pretreatment liquid, it is preferable that the weight-average molecular weight of the cationic polymer is small. In a case where the pretreatment liquid is applied to a recording medium by an ink jet recording method, the weight-average molecular weight thereof is preferably in a range of 1,000 to 500,000, more preferably in a range of 1,500 to 200,000, and still more preferably in a range of 2,000 to 100,000. It is advantageous that the weight-average molecular weight thereof is 1,000 or greater from the viewpoint of aggregation rate. It is advantageous that the weight-average molecular weight thereof is 500,000 or less from the viewpoint of jetting reliability. However, in a case where the pretreatment liquid is applied to a recording medium by a method other than the ink jet recording method, the weight-average molecular weight thereof is not limited thereto.

The content of the aggregating agent in the pretreatment liquid is preferably in a range of 0.1% by mass to 40% by mass, more preferably in a range of 0.1% by mass to 30% by mass, still more preferably in a range of 1% by mass to 20% by mass, and even still more preferably in a range of 1% by mass to 10% by mass with respect to the total amount of the pretreatment liquid.

From the viewpoint of further improving the boiling resistance of the laminate, it is preferable that the aggregating agent includes at least one selected from the group consisting of an organic acid and an organic acid polyvalent metal salt as a polyvalent metal compound.

In this case, the proportion of the total amount of the organic acid and the organic acid polyvalent metal salt in the total amount of the aggregating agent is preferably in a range of 50% by mass to 100% by mass, more preferably in a range of 60% by mass to 100% by mass, and still more preferably in a range of 80% by mass to 100% by mass.

From the viewpoint of further improving the boiling resistance of the laminate, it is more preferable that the aggregating agent includes an organic acid.

In this case, the content of the organic acid in the total amount of the aggregating agent is preferably in a range of 50% by mass to 100% by mass, more preferably in a range of 60% by mass to 100% by mass, and still more preferably in a range of 80% by mass to 100% by mass.

<Urethane Resin>

The pretreatment liquid according to the present disclosure contains a urethane resin having a polyol unit, a polyisocyanate unit, and a polyalkylene glycol monoalkyl ether unit.

Each of the polyol unit, the polyisocyanate unit, and the polyalkylene glycol monoalkyl ether unit, which are contained in the urethane resin, may be used alone or two or more kinds thereof.

In the present disclosure, the polyol unit denotes a structural unit derived from a polyol, the polyisocyanate unit denotes a structural unit derived from polyisocyanate, and the polyalkylene glycol monoalkyl ether unit denotes a structural unit derived from polyalkylene glycol monoalkyl ether.

The urethane resin having the polyol unit, the polyisocyanate unit, and the polyalkylene glycol monoalkyl ether unit is, in other words, a reaction product obtained by reacting at least the polyol, the polyisocyanate, and the polyalkylene glycol monoalkyl ether.

As the polyol and the polyisocyanate for forming a urethane resin, for example, the description in paragraphs 0031 to 0036 of JP2001-247787A, paragraphs 0033 to 0118 of WO2016/052053A, and paragraphs 0066 to 0223 of WO2016/152254A can be referred to.

—Polyisocyanate Unit and Polyisocyanate—

The urethane resin has at least one polyisocyanate unit.

Hereinafter, preferable aspects of the polyisocyanate unit and preferable aspects of the polyisocyanate for forming the polyisocyanate unit will be described.

The polyisocyanate may be a polyisocyanate containing two isocyanate groups (that is, a diisocyanate (that is, a bifunctional isocyanate)) or a polyisocyanate containing three or more isocyanate groups (that is, a trifunctional or higher functional isocyanate).

A bifunctional to hexafunctional isocyanate is preferable as the polyisocyanate.

It is preferable that the polyisocyanate unit has the following structural unit (P1).

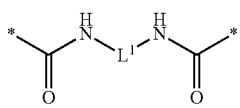

(P1)

In the structural unit (P1), $L^1$ represents a divalent organic group having 1 to 20 carbon atoms, and * represents a bonding position.

Specific examples of $L^1$ include a residue obtained by removing two isocyanate groups (NCO groups) from the bifunctional isocyanate according to the following specific examples.

Specific examples of the bifunctional isocyanate are as follows. However, the bifunctional isocyanate is not limited to the following specific examples.

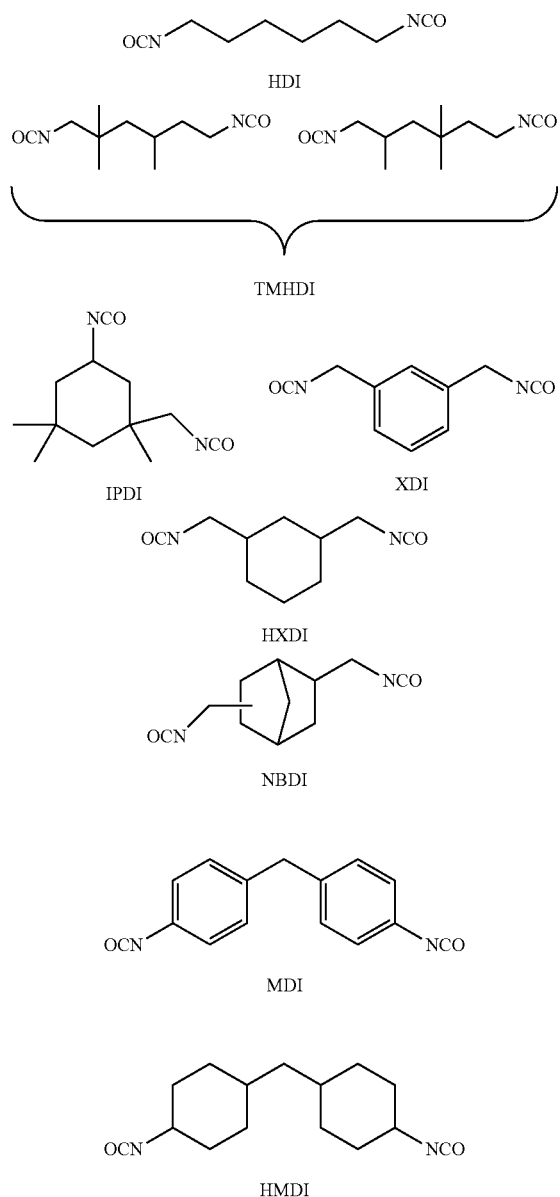

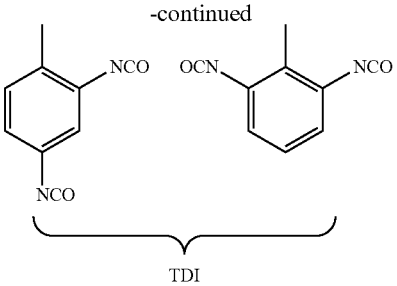

TDI

Further, a bifunctional isocyanate derived from the above-described specific examples can also be used as the bifunctional isocyanate. Examples thereof include DURANATE (registered trademark) D101, D201, and A101 (manufactured by Asahi Kasei Corporation).

In addition, it is preferable that the trifunctional or higher functional isocyanate is a reaction product of at least one selected from the group consisting of a bifunctional isocyanate and at least one selected from the group consisting of a compound containing three or more active hydrogen groups (for example, a trifunctional or higher functional polyol compound, a trifunctional or higher functional polyamine compound or a trifunctional or higher functional polythiol compound).

The number of moles (number of molecules) of the bifunctional isocyanate to react with the compound containing three or more active hydrogen groups is preferably 0.6 times or greater, more preferably 0.6 times to 5 times, still more preferably 0.6 times to 3 times, and even still more preferably 0.8 times to 2 times with respect to the number of moles of the active hydrogen group (number of equivalents of the active hydrogen group) in the compound containing three or more active hydrogen groups.

Examples of the bifunctional isocyanate for forming a trifunctional or higher functional isocyanate include the bifunctional isocyanates described in the above-described specific examples.

Examples of the compound containing three or more active hydrogen groups for forming a trifunctional or higher functional isocyanate include the compounds described in paragraphs 0057 and 0058 of WO2016/052053A.

Examples of the trifunctional or higher functional isocyanate include an adduct type trifunctional or higher functional isocyanate, an isocyanurate type trifunctional or higher functional isocyanate, and a biuret type trifunctional or higher functional isocyanate.

Examples of commercially available products of the adduct type trifunctional or higher functional isocyanate include TAKENATE (registered trademark) D-102, D-103, D-103H, D-103M2, P49-75S, D-110N, D-120N, D-140N, and D-160N (all manufactured by Mitsui Chemicals, Inc.), DESMODUR (registered trademark) L75 and UL57SP (Sumika Bayer Urethane Co., Ltd.), CORONATE (registered trademark) HL, HX, and L (Tosoh Corporation), and P301-75E (Asahi Kasei Corporation.).

Examples of commercially available products of the isocyanate type trifunctional or higher functional isocyanate include TAKENATE (registered trademark) D-127N, D-170N, D-170HN, D-172N, and D-177N (all manufactured by Mitsui Chemicals, Inc.), SUMIDUR N3300 and DESMODUR (registered trademark) N3600, N3900, and Z4470BA (all manufactured by Sumika Bayer Urethane Co., Ltd.), CORONATE (registered trademark) HX and HK (both manufactured by Tosoh Corporation), and DURAN- ATE (registered trademark) TPA-100, TKA-100, TSA-100, TSS-100, TLA-100, and TSE-100 (all manufactured by Asahi Kasei Corporation).

Examples of commercially available products of the biuret type trifunctional or higher functional isocyanate include TAKENATE (registered trademark) D-165N and NP1100 (both manufactured by Mitsui Chemicals, Inc.), DESMODUR (registered trademark) N3200 (sumika Bayer Urethane Co., Ltd.), and DURANATE (registered trademark) 24A-100 (Asahi Kasei Corporation).

At least one of the polyisocyanates may be a polyisocyanate containing a hydrophilic group. The polyisocyanate containing a hydrophilic group can refer to the description in paragraphs 0112 to 0118 and 0252 to 0254 of WO2016/052053A.

At least one of the polyisocyanates may be a polyisocyanate containing a polymerizable group. The isocyanate containing a polymerizable group can refer to the description in paragraphs 0084 to 0089, 0203, and 0205 of WO2016/052053A.

—Polyol Unit and Polyol—

The urethane resin has at least one polyol unit.

Hereinafter, preferable aspects of the polyol unit and preferable aspects of the polyol for forming the polyol unit will be described.

The polyol may be a polyol having two hydroxy groups (that is, a diol) or a polyol having three or more hydroxy groups.

It is preferable that the polyol unit has a structural unit (P0) shown below.

(P0)

In the structural unit (P0), $L^0$ represents a divalent organic group, and * represents a bonding position.

In the structural unit (P0), the divalent organic group represented by $L^0$ may be a group consisting of a carbon atom and a hydrogen atom or a group having a carbon atom, a hydrogen atom, and a heteroatom (such as an oxygen atom, a nitrogen atom, or a sulfur atom).

The divalent organic group represented by $L^0$ may include at least one of a hydrophilic group or a polymerizable group.

Specific examples of $L^0$ include residues obtained by removing a hydrogen atom from each of two hydroxy groups in the diol shown below.

Hereinafter, specific examples of the diol which is a preferable aspect of the polyol will be shown, but the polyol is not limited to the following specific examples.

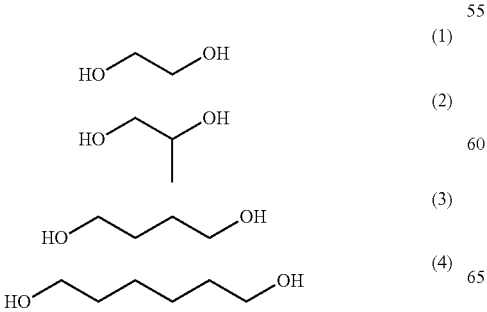

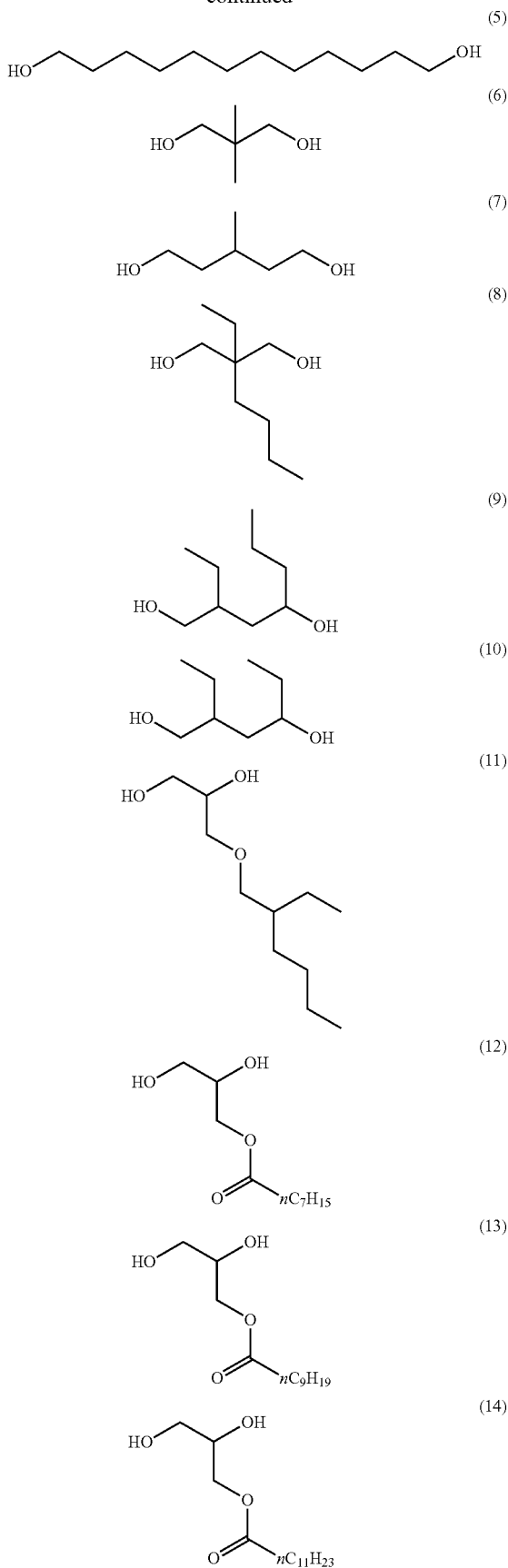

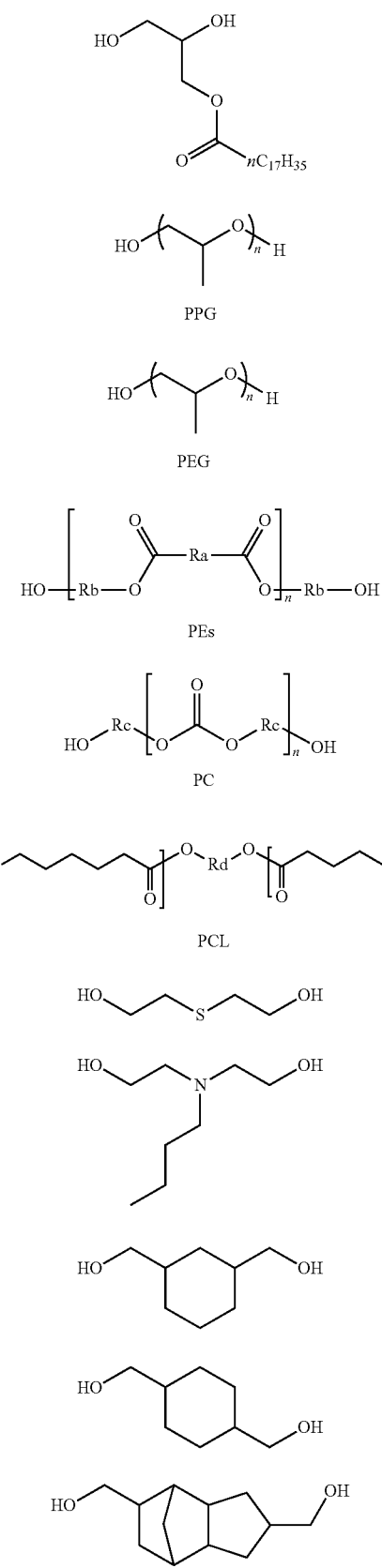

Among the compounds (12) to (15), $nC_7H_{15}$, $nC_9H_{19}$, $nC_{11}H_{23}$, and $nC_{17}H_{35}$ each represent a normal heptyl group, a normal nonyl group, a normal undecyl group, or a normal heptadecyl group.

The compound (16) PPG is polypropylene glycol, and n represents a repetition number.

The compound (16-2) PEG is polyethylene glycol, and n represents a repetition number.

The compound (17) PEs is a polyester diol, n represents a repetition number, and Ra and two Rb's each independently represent a divalent hydrocarbon group having 2 to 25 carbon atoms. n Ra's in the compound (17) PEs may be the same as or different from each other. (n+1) Rb's in the compound (17) PEs may be the same as or different from each other.

The compound (18) PC is a polycarbonate diol, n represents a repetition number, and (n+1) Rc's each independently represent an alkylene group having 2 to 12 carbon atoms (preferably 3 to 8 carbon atoms and more preferably 3 to 6 carbon atoms). (n+1) Rc's in the compound (18) PC may be the same as or different from each other.

The compound (19) PCL is a polycaprolactone diol, n and m each represent a repetition number, and Rd represents an alkylene group having 2 to 25 carbon atoms.

It is preferable that the polyol unit in the urethane resin has a polycarbonate diol unit. In this manner, the boiling resistance of the laminate is further improved.

In this case, the proportion of the polycarbonate diol unit in the total amount of the polyol unit is preferably in a range of 50% by mass to 100% by mass, more preferably in a range of 60% by mass to 100% by mass, and still more preferably in a range of 80% by mass to 100% by mass.

The polycarbonate diol for forming the polycarbonate diol unit is, for example, the above-described compound (18) PC.

A commercially available product may be used as the polycarbonate diol.

Examples of the commercially available product include DURANOL T5652 (manufactured by Asahi Kasei Corporation), DURANOL T5651 (manufactured by Asahi Kasei Corporation), DURANOL T6002 (manufactured by Asahi Kasei Corporation), DURANOL T6001 (manufactured by Asahi Kasei Corporation), BENEBiOL HS0830B (manufactured by Mitsubishi Chemical Corporation), BENEBiOL HS0840H (manufactured by Mitsubishi Chemical Corporation), BENEBiOL NL1010DB (manufactured by Mitsubishi Chemical Corporation), and BENEBiOL NL2010DB (manufactured by Mitsubishi Chemical Corporation).

It is preferable that the polyol unit in the urethane resin has a polycarbonate diol unit. In this manner, the boiling resistance of the laminate is further improved.

In this case, the proportion of the polycarbonate diol unit in the total amount of the polyol unit is preferably in a range of 50% by mass to 100% by mass, more preferably in a range of 60% by mass to 100% by mass, and still more preferably in a range of 80% by mass to 100% by mass.

—Polyalkylene Glycol Monoalkyl Ether Unit and Polyalkylene Glycol Monoalkyl Ether—

The urethane resin has at least one polyalkylene glycol monoalkyl ether unit.

Examples of the polyalkylene glycol monoalkyl ether for forming the polyalkylene glycol monoalkyl ether unit include a polymer obtained by addition polymerization of ethylene oxide or propylene oxide to any alcohol (such as methanol, ethanol, 1-propanol, 2-propanol, or 1-butanol).

Specific examples of the polyalkylene glycol monoalkyl ether include polyethylene glycol monomethyl ether, polyethylene glycol monoethyl ether, polyethylene glycol monopropyl ether, polyethylene glycol monobutyl ether, polypropylene glycol monomethyl ether, polypropylene glycol monoethyl ether, polypropylene glycol monopropyl ether, and polypropylene glycol monobutyl ether.

From the viewpoint of further improving the boiling resistance of the laminate, the content of the polyalkylene glycol monoalkyl ether unit is preferably in a range of 2% by mass to 30% by mass, more preferably in a range of 3% by mass to 25% by mass, and still more preferably in a range of 5% by mass to 20% by mass with respect to the total amount of the urethane resin.

From the viewpoint of further improving the boiling resistance of the laminate, in a case where the number average molecular weight of the polyalkylene glycol monoalkyl ether for forming the polyalkylene glycol monoalkyl ether unit is defined as a and the number average molecular weight of the urethane resin is defined as b, (a/b)×100 is preferably in a range of 1.0 to 30.0, more preferably in a range of 1.5 to 25.0, still more preferably in a range of 2.5 to 20.0, and even still more preferably 2.5 to 16.0.

The number average molecular weight (hereinafter, also referred to as "molecular weight (a)") of the polyalkylene glycol monoalkyl ether for forming the polyalkylene glycol monoalkyl ether unit is preferably in a range of 500 to 20,000, more preferably in a range of 500 to 10,000, still more preferably in a range of 700 to 7,000, and even still more preferably in a range of 750 to 5,000.

The molecular weight (a) is determined by hydrolyzing a urethane resin, separating the polyalkylene glycol monoalkyl ether from the obtained hydrolyzate, and measuring the number average molecular weight of the separated polyalkylene glycol monoalkyl ether using a measuring method described below.

Here, the hydrolysis of the urethane resin is carried out by adding an alkali to an aqueous solution of the urethane resin and heating the solution.

The separation of the polyalkylene glycol monoalkyl ether from the hydrolyzate of the urethane resin is performed by adding an organic solvent to the hydrolyzate of the urethane resin and extracting components other than the polyalkylene glycol monoalkyl ether.

The number average molecular weight of the urethane resin (hereinafter, also referred to as "molecular weight (b)") is preferably in a range of 3,000 to 200,000, more preferably in a range of 4,000 to 100,000, still more preferably in a range of 5,000 to 80,000, and even still more preferably in a range of 10,000 to 50,000.

In the present disclosure, the number average molecular weight (for example, the molecular weight (a) and the molecular weight (b) described above) and the weight-average molecular weight are respectively measured by gel permeation chromatography (GPC). The measurement according to GPC is performed by connecting three columns of TSKgeL Super HZM-H, TSKgeL Super HZ4000, and TSKgel Super HZ2000 (all trade names, manufactured by Tosoh Corporation) in series using HLC-8220GPC (manufactured by Tosoh Corporation) and tetrahydrofuran (THF) as an eluent. Further, the measurement is performed under conditions of a sample concentration of 0.45% by mass, a flow rate of 0.35 ml/min, a sample injection volume of 10 µl, and a measurement temperature of 40° C. using a differential refractive index detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The urethane resin may be a water-soluble urethane resin or a water-insoluble urethane resin (that is, urethane resin particles).

Among these, from the viewpoint of increasing the strength of the layer to be formed by using the pretreatment liquid, it is preferable that the urethane resin is in the form of urethane resin particles.

In the present disclosure, the term "water-soluble" indicates a property that 1 g or greater of a substance is dissolved in 100 g of water at 25° C.

In the present disclosure, the term "water-insoluble" indicates a property that less than 1 g of a substance is dissolved in 100 g of water at 25° C.

The average particle diameter of the urethane resin particles is preferably in a range of 1 nm to 200 nm, more preferably in a range of 3 nm to 200 nm, and still more preferably in a range of 50 nm to 150 nm.

Further, the average particle diameter thereof is determined by measuring the volume average particle diameter using a particle size distribution measuring device, for example, "NANOTRAC UPA-EX150" (product name, manufactured by Nikkiso Co., Ltd.) by a dynamic light scattering method.

The content of the urethane resin in the pretreatment liquid is preferably in a range of 1% by mass to 30% by mass, more preferably in a range of 3% by mass to 20% by mass, and still more preferably in a range of 5% by mass to 15% by mass with respect to the total amount of the pretreatment liquid.

(Organic Solvent)

The pretreatment liquid according to the present disclosure may contain at least one organic solvent.

The kind of the organic solvent is not limited, and examples thereof include a monoalcohol having 1 to 4 carbon atoms; a diol such as 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; a triol such as glycerin, 1,2,6-hexanetriol, or trimethylolpropane; alkylene glycol such as ethylene glycol or propylene glycol; alkylene glycol monoalkyl ether such as ethylene glycol monoalkyl ether or propylene glycol monoalkyl ether; polyalkylene glycol such as diethylene glycol, triethylene glycol, tetraethylene glycol, pentaethylene glycol, dipropylene glycol, or polyoxyethylene polyoxypropylene glycol; polyalkylene glycol ether such as diethylene glycol monoalkyl ether, triethylene glycol monoalkyl ether, tripropylene glycol monoalkyl ether, or polyoxypropylene glyceryl ether; 2-pyrrolidone, and N-methyl-2-pyrrolidone.

The content of the organic solvent is preferably in a range of 1% by mass to 20% by mass and more preferably in a range of 3% by mass to 10% by mass with respect to the total amount of the pretreatment liquid.

<Surfactant>

The pretreatment liquid according to the present disclosure may contain at least one surfactant.

The kind of the surfactant is not particularly limited, and may be any of an anionic surfactant, a cationic surfactant, a betaine-based surfactant, or a nonionic surfactant. Further, examples of the surfactant include an acrylic surfactant, a fluorine-based surfactant, and a silicone-based surfactant.

The content of the surfactant is preferably in a range of 0.1% by mass to 5% by mass and more preferably in a range of 0.2% by mass to 1% by mass with respect to the total amount of the pretreatment liquid.

<Other Components>

The pretreatment liquid of the present disclosure may contain other components in addition to the above-described components as necessary.

Examples of other components that may be contained in the pretreatment liquid include known additives such as a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

<Physical Properties>

The pH of the pretreatment liquid is preferably in a range of 2.0 to 7.0 and more preferably in a range of 2.0 to 4.0. The pH is measured at 25° C. using a pH meter, for example, a pH meter (model number "HM-31", manufactured by DKK-TOA CORPORATION).

From the viewpoint of the coating properties of the pretreatment liquid, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer.

The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

[Ink Set]

An ink set according to the embodiment of the present disclosure includes the pretreatment liquid of the present disclosure described above and a first ink which is an ink jet ink containing water and a urethane resin.

Since the ink set of the present disclosure contains the pretreatment liquid of the present disclosure, the same effect as the effect of the pretreatment liquid of the present disclosure is exhibited.

<First Ink>

The ink set of the present disclosure includes a first ink which is an ink jet ink containing water and a urethane resin.

The first ink may be used alone or in combination of two or more kinds thereof.

(Water)

The first ink contains water.

The content of water is preferably 10% by mass or greater, more preferably 20% by mass or greater, still more preferably 30% by mass or greater, and particularly preferably 50% by mass or greater with respect to the total amount of the first ink.

The upper limit of the content of water is appropriately determined according to the content of other components, and is, for example, 99% by mass, preferably 95% by mass, and more preferably 90% by mass with respect to the total amount of the first ink.

(Urethane Resin)

The first ink contains at least one kind of urethane resin.

The colored ink may contain only one or two or more kinds of urethane resins.

The urethane resin in the colored ink and the urethane resin in the pretreatment liquid may be the same as or different from each other.

A polyester-based urethane resin having an ester bond in the main chain, a polycarbonate-based urethane resin having a carbonate bond in the main chain, or a polyether-based urethane resin having an ether bond in the main chain is preferable as the urethane resin in the first ink.

The urethane resin in the first ink may be a water-soluble urethane resin or a water-insoluble urethane resin (that is, urethane resin particles).

Among these, from the viewpoint of increasing the strength of the layer to be formed by using the first ink, it is preferable that the urethane resin is in the form of urethane resin particles.

In a case where the urethane resin in the first ink is in the form of urethane resin particles, from the viewpoint of jetting stability, the urethane resin particles have an average particle diameter of preferably 1 nm to 200 nm, more preferably 3 nm to 200 nm, and still more preferably 5 nm to 50 nm.

The average particle diameter of the urethane resin particles in the first ink can be measured by the same method as the method for measuring the average particle diameter of the urethane resin particles in the pretreatment liquid.

The urethane resin in the first ink may be any of anionic, cationic, or nonionic.

From the viewpoint of improving the storage stability of the first ink, it is preferable that the urethane resin is an anionic urethane resin.

The weight-average molecular weight (Mw) of the urethane resin in the first ink is not particularly limited, but is preferably in a range of 1,000 to 300,000, more preferably in a range of 2,000 to 200,000, and still more preferably in a range of 10,000 to 150,000.

The weight-average molecular weight of the urethane resin in the first ink can be measured by the same method as that for the weight-average molecular weight of the urethane resin in the pretreatment liquid.

A commercially available product may be used as the urethane resin in the first ink.

Examples of the commercially available product include SUPERFLEX Series (manufactured by DKS Co., Ltd.), PERMARIN UA Series and UCOAT Series (manufactured by Sanyo Chemical Industries, Ltd.), TAKELAC Series (manufactured by Mitsui Chemicals, Inc.), and PUE Series (manufactured by Murayama Chemical Laboratory Co., Ltd.).

The content of the urethane resin in the first ink is preferably in a range of 1% by mass to 20% by mass, more preferably in a range of 2% by mass to 15% by mass, and still more preferably in a range of 2% by mass to 10% by mass with respect to the total amount of the first ink.

(Pigment)

The first ink contains preferably a pigment (that is, at least one of a color pigment or a white pigment) and more preferably a white pigment.

It is still more preferable that the first ink is a white ink containing a white pigment.

(White Pigment)

Examples of the white pigment include inorganic pigments such as titanium dioxide, barium sulfate, calcium carbonate, silica, zinc oxide, zinc sulfide, mica, talc, and pearl.

Among these, the white pigment is preferably titanium dioxide, barium sulfate, calcium carbonate, or zinc oxide and more preferably titanium dioxide.

From the viewpoint of the covering property, the average primary particle diameter of the white pigment is preferably 150 nm or greater and more preferably 200 nm or greater. Further, from the viewpoint of the jettability of the ink, the average primary particle diameter of the white pigment is preferably 400 nm or less and more preferably 350 nm or less.

In the present disclosure, the average primary particle diameter of the white pigment is a value measured using a transmission electron microscope (TEM). Specifically, the average primary particle diameter of the white pigment is a value determined by selecting 50 optional particles of the white pigment present in a visual field observed by a TEM, measuring the primary particle diameters of 50 particles, and averaging the measured diameters. As the transmission electron microscope, a transmission electron microscope 1200EX (manufactured by JEOL Ltd.) can be used.

From the viewpoints of the image density and the jettability, the content of the white pigment is preferably in a range of 2% by mass to 25% by mass, more preferably in a range of 5% by mass to 25% by mass, and still more preferably in a range of 10% by mass to 20% by mass with respect to the total amount of the first ink.

Further, the first ink may contain a color pigment in place of or in addition to the white pigment.

In a case of an aspect in which the first ink contains a color pigment, the kind and the content of the color pigment can refer to the description in the section of the second ink.

(Pigment Dispersing Resin)

The first ink may contain at least one pigment dispersing resin.

In the present disclosure, the pigment dispersing resin is a resin having a function of dispersing a pigment.

The pigment dispersing resin may be a random copolymer or a block copolymer.

Further, the pigment dispersing resin may have a cross-linking structure.

The first ink may be prepared using a pigment dispersion liquid containing a pigment and a pigment dispersing resin.

A random copolymer is preferable as the pigment dispersing resin.

It is preferable that the random copolymer has a structural unit derived from a hydrophobic monomer and a structural unit derived from a monomer containing an anionic group (hereinafter, referred to as "anionic group-containing monomer"). From the viewpoint of dispersion stability, the content ratio (x:y) of a structural unit x derived from a hydrophobic monomer to a structural unit y derived from an anionic group-containing monomer is preferably in a range of 8:1 to 1:1.

The structural unit contained in the random copolymer and derived from a hydrophobic monomer may be used alone or two or more kinds thereof.

The structural unit contained in the random copolymer and derived from an anionic group-containing monomer may be used alone or two or more kinds thereof.

The hydrophobic monomer includes preferably a monomer containing a hydrocarbon group having 4 or more carbon atoms, more preferably an ethylene unsaturated monomer containing a hydrocarbon group having 4 or more carbon atoms, and still more preferably a (meth)acrylate containing a hydrocarbon group having 4 or more carbon atoms. The hydrocarbon group may be any of a chain-like hydrocarbon group, an alicyclic hydrocarbon group, or an aromatic hydrocarbon group. The number of carbon atoms of the hydrocarbon group is more preferably 6 or more and still more preferably 10 or more. The upper limit of the number of carbon atoms of the hydrocarbon group is, for example, 20.

Examples of the (meth)acrylate containing a chain-like hydrocarbon group having 4 or more carbon atoms include n-butyl (meth)acrylate, 2-ethylhexyl (meth)acrylate, octyl (meth)acrylate, lauryl (meth)acrylate, and stearyl (meth)acrylate. The number of carbon atoms in the chain-like hydrocarbon group is preferably 6 or more, more preferably 8 or more, and particularly preferably 12 or more. Among these, it is preferable that the ethylene unsaturated monomer containing a chain-like hydrocarbon group having 4 or more carbon atoms is lauryl (meth)acrylate or stearyl (meth)acrylate.

Examples of the (meth)acrylate containing an alicyclic hydrocarbon group having 4 or more carbon atoms include (bicyclo[2.2.1]heptyl-2) (meth)acrylate, 1-adamantyl (meth)acrylate, 2-adamantyl (meth)acrylate, 3-methyl-1-adamantyl (meth)acrylate, 3,5-dimethyl-1-adamantyl (meth)acrylate, 3-ethyladamantyl (meth)acrylate, 3-methyl-5-ethyl-1-adamantyl (meth)acrylate, 3,5,8-triethyl-1-adamantyl (meth)acrylate, 3,5-dimethyl-8-ethyl-1-adamantyl (meth)acrylate, 2-methyl-2-adamantyl (meth)acrylate, 2-ethyl-2-adamantyl (meth)acrylate, 3-hydroxy-1-adamantyl (meth)acrylate, octahydro-4,7-methanoinden-5-yl (meth)acrylate, octahydro-4,7-methanoinden-1-ylmethyl (meth)acrylate, 1-methyl (meth)acrylate, tricyclodecane (meth)acrylate, 3-hydroxy-2,6,6-trimethyl-bicyclo[3.1.1]heptyl (meth)acrylate, 3,7,7-trimethyl-4-hydroxy-bicyclo[4.1.0]heptyl (meth)acrylate, (nor)bornyl (meth)acrylate, isobornyl (meth)acrylate, 2,2,5-trimethylcyclohexyl (meth)acrylate, and cyclohexyl (meth)acrylate. The number of carbon atoms of the alicyclic hydrocarbon group is more preferably 6 or more. Among these, it is preferable that the ethylene unsaturated monomer containing an alicyclic hydrocarbon group having 4 or more carbon atoms is isobornyl (meth)acrylate or cyclohexyl (meth)acrylate.

Examples of the (meth)acrylate containing an aromatic hydrocarbon group having 4 or more carbon atoms include 2-naphthyl (meth)acrylate, phenoxyethyl (meth)acrylate, and benzyl (meth)acrylate. Among these, benzyl (meth)acrylate is preferable as the ethylene unsaturated monomer containing an aromatic hydrocarbon group having 4 or more carbon atoms.

The hydrophobic monomer may further contain a (meth)acrylate containing a hydrocarbon group having 1 to 3 carbon atoms.

Examples of the (meth)acrylate containing a hydrocarbon group having 1 to 3 carbon atoms include methyl (meth)acrylate, ethyl (meth)acrylate, n-propyl (meth)acrylate, and hydroxyethyl (meth)acrylate.

Among these, from the viewpoint of improving the dispersion stability of the white pigment, it is preferable that the structural unit contained in the pigment dispersing resin and derived from a hydrophobic monomer includes a structural unit derived from a (meth)acrylate containing a chain-like hydrocarbon group having 4 or more carbon atoms and a structural unit derived from a (meth)acrylate containing an aromatic hydrocarbon group having 4 or more carbon atoms.

Examples of the anionic group in the anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group.

Examples of the carboxy group-containing monomer include (meth)acrylic acid, 3-carboxyethyl acrylate, fumaric acid, itaconic acid, maleic acid, and crotonic acid.

From the viewpoint of the dispersion stability, (meth) acrylic acid or β-carboxyethyl acrylate is preferable, and (meth)acrylic acid is more preferable as the anionic group-containing monomer.

The ratio between the content of the white pigment and the content of the pigment dispersing resin is preferably in a range of 1:0.04 to 1:3, more preferably in a range of 1:0.05 to 1:1, and still more preferably in a range of 1:0.05 to 1:0.5 in terms of the mass.

From the viewpoint of the dispersion stability, the acid value of the pigment dispersing resin is preferably 100 mgKOH/g or greater and more preferably 120 mgKOH/g or greater.

Meanwhile, from the viewpoint of setting the acid value of the first ink to 8 mgKOH/g or less, the acid value of the pigment dispersing resin is preferably 300 mgKOH/g or less and more preferably 230 mgKOH/g or less.

In a case where the first ink contains the pigment dispersing resin, the content of the pigment dispersing resin is preferably in a range of 0.1% by mass to 10% by mass, more preferably in a range of 0.3% by mass to 5% by mass, and still more preferably in a range of 0.5% by mass to 2.5% by mass with respect to the total amount of the first ink.

(Organic Solvent)

It is preferable that the first ink contains an organic solvent.

In this manner, jetting stability is improved.

The colored ink may contain only one or two or more kinds of organic solvents.

Examples of the organic solvent include the same organic solvents as the organic solvents contained in the pretreatment liquid.

From the viewpoint of the jetting stability, it is preferable that the organic solvent includes at least one selected from the group consisting of alkylene glycol and alkylene glycol monoalkyl ether.

The content of the organic solvent is preferably in a range of 10% by mass to 40% by mass and more preferably in a range of 15% by mass to 30% by mass with respect to the total amount of the first ink.

(Additive)

The first ink may contain additives such as a surfactant, a water-soluble resin, a co-sensitizer, an ultraviolet absorbing agent, an antioxidant, a fading inhibitor, a conductive salt, and a basic compound as necessary.

(Physical Properties)

From the viewpoint of improving the jetting stability, the pH (25° C.) of the first ink is preferably in a range of 7 to 10 and more preferably in a range of 7.5 to 9.5. The pH of the colored ink can be measured by the same method as that for the pH of the pretreatment liquid.

The viscosity (25° C.) of the first ink is preferably in a range of 0.5 mPa·s to 30 mPa·s, more preferably in a range of 2 mPa·s to 20 mPa·s, still more preferably in a range of 2 mPa·s to 15 mPa·s, and even still more preferably in a range of 3 mPa·s to 10 mPa·s. The viscosity of the colored ink can be measured by the same method as that for the viscosity of the pretreatment liquid.

The surface tension (25° C.) of the first ink is preferably 60 mN/m or less, more preferably in a range of 20 mN/m to 50 mN/m, and still more preferably in a range of 30 mN/m to 45 mN/m.

The surface tension can be measured by the same method as that for the pretreatment liquid.

<Second Ink>

The ink set of the present disclosure may include a second ink which is an ink jet ink containing water, a color pigment, and a urethane resin.

One of the preferable aspects of the ink set according to the present disclosure is an aspect in which the ink set includes the pretreatment liquid of the present disclosure, the first ink as a white ink, which is an ink jet ink containing water, a white pigment, and a urethane resin, and a second ink as a colored ink, which is an ink jet ink containing water, a color pigment, and a urethane resin.

In the present disclosure, the color pigment denotes a chromatic pigment or a black pigment.

In the present disclosure, the colored ink denotes a chromatic ink (such as a cyan ink, a magenta ink, or a yellow ink) or a black ink.

The preferable aspects of the second ink are the same as the preferable aspects of the first ink except that the second ink contains a color pigment as an indispensable component.

For example, the preferable aspects of each of the content of water, the kind of urethane resin, and the content of the urethane resin in the second ink are respectively the same as the preferable aspects of the content of water, the kind of urethane resin, and the content of the urethane resin in the first ink.

(Color Pigment)

A commercially available organic pigment or inorganic pigment may be used as the color pigment.

Examples of the color pigment include pigments described in "Encyclopedia of Pigments" edited by Seishiro Ito (2000), "Industrial Organic Pigments", W. Herbst, K. Hunger, JP2002-12607A, JP2002-188025A, JP2003-26978A, and JP2003-342503A.

Further, the color pigment may be a water-insoluble pigment that can be dispersed in water by a dispersing agent, or may be a self-dispersing pigment.

The self-dispersing pigment is a pigment that can be dispersed in water without using a dispersing agent.

The self-dispersing pigment is, for example, a compound in which at least one selected from the group consisting of hydrophilic groups such as a carbonyl group, a hydroxyl group, a carboxyl group, a sulfo group, and a phosphoric acid group and salts thereof is chemically bonded to a surface of a pigment directly or via another group.

The kind of the color pigment is not particularly limited, and examples thereof include a cyan pigment, a magenta pigment, a yellow pigment, and a black pigment.

From the viewpoints of the image density and the jettability of the second ink, the content of the color pigment is preferably in a range of 1% by mass to 20% by mass, more preferably in a range of 1% by mass to 15% by mass, and still more preferably in a range of 1% by mass to 10% by mass with respect to the total amount of the second ink.

[Image Recording Method]

An image recording method of the present disclosure is an image recording method using the ink set of the present disclosure described above.

The image recording method of the present disclosure includes a step of applying the pretreatment liquid in the ink set of the present disclosure onto an impermeable base material (hereinafter, also referred to as "pretreatment liquid applying step") and a step of applying the first ink in the ink set of the present disclosure onto the impermeable base material onto which the pretreatment liquid has been applied, using an ink jet recording method (hereinafter, also referred to as "first ink applying step").

Since the image recording method according to the present disclosure is performed using the ink set according to the present disclosure described above, the same effects as the effects of the ink set according to the present disclosure described above are exhibited.

<Pretreatment Liquid Applying Step>

The pretreatment liquid applying step is a step of applying the pretreatment liquid in the ink set of the present disclosure (that is, the pretreatment liquid of the present disclosure) onto the impermeable base material.

(Impermeable Base Material)

In the present disclosure, the impermeability in the impermeable base material denotes a property that the water absorption rate in 24 hours which is measured in conformity with ASTM D570-98 (2018) is 2.5% or less. Here, the unit "%" of the water absorption rate is on a mass basis. The water absorption rate is preferably 1.0% or less and more preferably 0.5% or less.

Examples of the material of the impermeable base material include glass, a metal (such as aluminum, zinc, or copper), and a resin (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is preferable that the material of the impermeable base material is a resin. That is, it is preferable that the impermeable base material is a resin base material.

Examples of the material of the impermeable base material are as described above, but polypropylene, polyethylene, polyethylene terephthalate, nylon, an acrylic resin, or polyvinyl chloride is preferable from the viewpoint of versatility.

As the shape of the impermeable base material, a sheet-like (film-like) or a plate-like impermeable base material is preferable. Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

Further, the thickness of the impermeable base material is preferably in a range of 0.1 m to 1,000 m, more preferably in a range of 0.1 µm to 800 m, and still more preferably in a range of 1 µm to 500 km.

The impermeable base material may be subjected to a hydrophilization treatment. Examples of the hydrophilization treatment include a corona treatment, a plasma treatment, a flame treatment, a heat treatment, an abrasion treatment, a light irradiation treatment (such as a UV treatment), and a flame treatment, but the hydrophilization treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

The impermeable base material may be an impermeable base material having transparency.

Here, the expression of "having transparency" denotes that the transmittance of visible light having a wavelength of 400 nm to 700 nm is 80% or greater (preferably 90% or greater).

In a case where the impermeable base material is an impermeable base material having transparency, the image is easily visually recognized through the impermeable base material from the image non-recorded surface side of the impermeable base material.

For example, in a case where the impermeable base material is an impermeable base material having transparency, a colored image (for example, a pattern image such as a character or a FIGURE) having a white image (for example, a solid image) as a background is easily visually recognized through the impermeable base material from the image non-recorded surface side of the impermeable base material in a case where the pretreatment liquid, the second ink as the colored ink, and the first ink as the white ink are applied in this order onto the impermeable base material to record an image.

(Application of Pretreatment Liquid)

A method of applying the pretreatment liquid is not particularly limited, and examples thereof include known methods such as a coating method, a dipping method, and an ink jet recording method.

Examples of the coating method include known coating methods using a bar coater, an extrusion die coater, an air doctor coater, a blade coater, a rod coater, a knife coater, a squeeze coater, and a reverse roll coater.

(Heating and Drying Pretreatment Liquid)

The pretreatment liquid applying step may include applying the pretreatment liquid onto the impermeable base material and heating and drying the pretreatment liquid applied onto the impermeable base material.

Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

<First Ink Applying Step>

The first ink applying step is a step of applying the first ink onto the impermeable base material onto which the pretreatment liquid has been applied, using an ink jet recording method.

By performing the present step, the components in the first ink are aggregated by the action of the aggregating agent in the pretreatment liquid on the impermeable base material, and thus an image is obtained.

(Application of First Ink)

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the first ink onto the impermeable base material using the ink jet recording method is performed by jetting the first ink from a nozzle of an ink jet head.

Examples of the system of the ink jet head include a shuttle system of performing recording while scanning a short serial head in the width direction of a medium to be recorded and a line system of using a line head in which recording elements are aligned in correspondence with the entire area of one side of a medium to be recorded.

In the line system, image recording can be performed on the entire surface of the medium to be recorded by scanning the medium to be recorded in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the first ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet volume of the first ink is preferably in a range of 1 picoliter (pL) to 10 μL and more preferably in a range of 1.5 pL to 6 pL.

(Heating and Drying)

The first ink applying step may include applying the first ink onto the impermeable base material onto which the pretreatment liquid has been applied, using an ink jet method, and heating and drying the applied first ink.

A method of heating and drying the colored ink is not particularly limited, and examples thereof include infrared (IR) drying, warm air drying, and heating and drying using a heating device (for example, a heater, a hot plate, a heating furnace, or the like).

The method of heating and drying the colored ink may be a method of combining two or more of the above-described methods.

The heating and drying can be performed by heating the first ink from at least one of the image recorded surface side or the image non-recorded surface side of the impermeable base material.

The heating temperature during the heating and drying of the first ink is preferably 35° C. or higher, more preferably 40° C. or higher, still more preferably 50° C. or higher, and even still more preferably 60° C. or higher.

The upper limit of the heating temperature is not particularly limited, but is preferably 100° C. and more preferably 90° C.

The heating time during the heating and drying of the first ink is not particularly limited, but is preferably in a range of 1 second to 180 seconds, more preferably in a range of 1 second to 120 seconds, and still more preferably in a range of 1 second to 60 seconds.

<Embodiment>

An embodiment of the image recording method according to the present disclosure relates to an image recording method using the ink set according to the aspect of including the first ink and the second ink described above.

The image recording method according to the present embodiment includes a step of applying the pretreatment liquid in the ink set according to the present disclosure onto the impermeable base material and a step of applying each of the first ink and the second ink in the ink set according to the present disclosure onto the impermeable base material onto which the pretreatment liquid has been applied, using an ink jet recording method.

The step of applying the pretreatment liquid onto the impermeable base material is as described above.

According to the image recording method of the present embodiment, a multicolor image can be recorded with the first ink (for example, the white ink) and the second ink (for example, the colored ink).

Examples of the multicolor image include a colored image (for example, a pattern image such as a character or a FIGURE) having a white image (for example, a solid image) as a background.

Any of the first ink (for example, the white ink) or the second ink (for example, the colored ink) may be applied first in the application order.

For example, in a case where the image is visually recognized from the image recorded surface side, the first ink as the white ink and the second ink as the colored ink are applied in this order.

In a case where the image is visually recognized from the image non-recorded surface side through the impermeable base material, the colored ink as the second ink and the white ink as the first ink are applied in this order. In this manner, for example, a multicolor image in which a pattern image (a character, a FIGURE, or the like) recorded with the colored ink and a white image in the form of a solid image recorded with the white ink to cover the pattern image are disposed on the impermeable base material in this order can be recorded.

The method of applying each of the first ink and the second ink using an ink jet recording method in the step of applying the first ink and the second ink is as described above.

Further, the step of applying the first ink and the second ink may include heating and drying the inks after application of at least one of the first ink or the second ink. The preferable conditions for heating and drying the inks are as described above.

Examples of the aspect of this step include an aspect in which the application of the colored ink as the second ink, the application of the white ink as the first ink, and drying of the inks are performed in this order. In this aspect, the second ink may or may not be heated and dried between the application of the second ink and the application of the first ink.

[Method of Producing Laminate]

The method of producing the laminate of the present disclosure includes a step of obtaining an image recorded material which comprises the impermeable base material and the image disposed on the impermeable base material using the image recording method described above; and a step of laminating a base material for lamination on a side of the image recorded material where the image is disposed to obtain a laminate.

Since the method of producing a laminate according to the present disclosure includes the image recording method according to the present disclosure described above, the same effects as the effects of the image recording method according to the present disclosure described above are exhibited. Specifically, a laminate having excellent boiling resistance can be obtained.

The step of obtaining an image recorded material can refer to the image recording method of the present disclosure.

The step of obtaining a laminate is a step of laminating the base material for lamination on a side of the image recorded material where the image has been disposed, to obtain a laminate.

The lamination can be performed by a method of superimposing the base material for lamination on the side of the image recorded material where the image has been disposed via another layer (for example, an adhesive layer) and attaching the base material thereto, a method of attaching the base material for lamination to the side of the image recorded material where the image has been disposed via a laminator in a state where the base material is superimposed on the side thereof, or the like. In the latter case, a commercially available laminator can be used.

The lamination temperature in a case of carrying out the lamination is not particularly limited. For example, in a case where the image recorded material and the base material for lamination are attached to each other via another layer (for example, an adhesive layer), the temperature may be 20° C. or higher. Further, in a case where a laminator is used, the temperature of a laminating roll may be set to be in a range of 20° C. to 80° C. The pressure-bonding force between a pair of laminating rolls may be appropriately selected as necessary.

It is preferable that the base material for lamination is a resin base material.

The resin base material is not particularly limited, and examples thereof include a base material consisting of a thermoplastic resin.

A base material obtained by molding a thermoplastic resin in a sheet shape is exemplified as the resin base material.

It is preferable that the resin base material contains polypropylene, polyethylene terephthalate, nylon, polyethylene, or polyimide.

The shape of the resin base material is not particularly limited, but it is preferable that the resin base material has a sheet shape. The thickness of the resin base material is preferably in a range of 10 µm to 200 µm and more preferably in a range of 10 µm to 100 m.

In the step of obtaining a laminate, the base material for lamination may be laminated directly on a side of the image recorded material where the image has been disposed or via another layer (for example, an adhesive layer).

In a case where the base material for lamination is laminated directly on a side of the image recorded material where the image has been disposed, the lamination can be performed by a known method such as thermocompression bonding or thermal fusion welding.

Further, in a case where the base material for lamination is laminated on a side of the image recorded material where the image has been disposed via an adhesive layer, the lamination can be performed by, for example, a method of coating the side of the image recorded material where the image has been disposed with an adhesive, placing the base material for lamination, and bonding the image recorded material to the base material for lamination.

Further, in the case where the base material for lamination is laminated on a side of the image recorded material where the image has been disposed via an adhesive layer, the lamination can also be performed by an extrusion lamination method (that is, sandwich lamination) or the like.

It is preferable that the adhesive layer contains an isocyanate. In a case where the adhesive layer contains an isocyanate, since the adhesiveness between the adhesive layer and the image is further improved, the boiling resistance can be further improved.

[Image Recorded Material]

The image recorded material according to the present disclosure includes an impermeable base material and an image disposed on the impermeable base material, in which the image includes a pretreatment layer disposed on the impermeable base material and containing at least one aggregating agent selected from the group consisting of an organic acid, a polyvalent metal compound, and a metal complex, and a urethane resin, and an ink layer disposed on the pretreatment layer and containing a pigment (for example, at least one of a white pigment or a color pigment) and a urethane resin, and the urethane resin in the pretreatment layer has a polyol unit, a polyisocyanate unit, and a polyalkylene glycol monoalkyl ether unit.

The image recorded material of the present disclosure can be produced by the image recording method of the present disclosure.

Therefore, a laminate with excellent boiling resistance can be produced.

The components in the pretreatment layer and the components in the ink layer can refer to the components of the pretreatment liquid described above, the components of the first ink described above, and the components of the second ink described above as appropriate.

The laminate according to the present disclosure includes the image recorded material according to the present disclosure described above and a base material for lamination which is laminated on the image of the image recorded material.

The laminate of the present disclosure can be produced by the method of producing the laminate of the present disclosure.

Therefore, the boiling resistance is excellent.

The preferable aspects of the base material for lamination are as described above.

EXAMPLES

Hereinafter, the present disclosure will be described in more detail based on examples, but the present disclosure is not limited to the following examples unless the gist thereof is overstepped.

Example 1

Preparation of Aqueous Dispersion Liquid of Urethane Resin Particles for Pretreatment Liquid A three-neck flask was charged with isophorone diisocyanate (IPDI) (14.4 g), DURANOL T5652 (manufactured by Asahi Kasei Corporation, polycarbonate diol; hereinafter, also referred to as "T5652") (87.6 g), and ethyl acetate (80.0 g) and heated to 70° C. 0.1 g of NEOSTANN U-600 (manufactured by NITTO KASEI CO., LTD., inorganic bismuth catalyst; hereinafter also referred to as "U-600") was added thereto, and the mixture was stirred at 70° C. for 3 hours.

Next, polyethylene glycol monomethyl ether (number average molecular weight of 550) (18.0 g) was added thereto, and the mixture was stirred at 70° C. for 3 hours.

Next, isopropanol (IPA) (84.5 g) as a terminal blocking material and ethyl acetate (126.5 g) were added thereto, and the mixture was stirred at 70° C. for 7 hours. The mixture was stirred for 7 hours and naturally cooled to room temperature, and the concentration thereof was adjusted using ethyl acetate, thereby obtaining a 30 mass % solution of urethane A (solvent: mixed solvent of IPA and ethyl acetate).

Distilled water (100 g) was added to the obtained 30 mass % solution (100 g) of urethane A, and the solution was emulsified at 12,000 rpm for 10 minutes at room temperature using a homogenizer, thereby obtaining an emulsion.

The obtained emulsion was heated to 50° C. and stirred at 50° C. for 5 hours to distill off ethyl acetate from the liquid.

The liquid from which ethyl acetate had been distilled off was diluted with distilled water so that the solid content reached 25% by mass, thereby obtaining an aqueous dispersion liquid of urethane resin particles (solid content of 25% by mass).

Preparation of Pretreatment Liquid

A pretreatment liquid having the following composition was prepared using components other than the aqueous dispersion liquid of urethane resin particles and the urethane resin particles among the following components.
—Composition of Pretreatment Liquid—
  Ethanol: 5% by mass
  Urethane resin particles: 10% by mass
  Aggregating agent: 5% by mass
  Surfactant (product name "OLFINE E1010", manufactured by Nissin Chemical Industry Co., Ltd.): 0.5% by mass
  Water: remaining amount set such that total amount of pretreatment liquid reached 100% by mass Synthesis of Pigment Dispersing Resin 1

100 g of dipropylene glycol was added to a three-neck flask provided with a stirrer and a cooling pipe and heated to 85° C. in a nitrogen atmosphere.

A solution 1 obtained by mixing 14.0 g of stearyl methacrylate, 35.3 g of benzyl methacrylate, 20.0 g of hydroxyethyl methacrylate, 30.7 g of methacrylic acid, and 0.55 g of 2-mercaptopropionic acid and a solution 2 obtained by dissolving 1.0 g of t-butyl peroxy-2-ethylhexanoate (product name, "PERBUTYL O", manufactured by NOF Corporation) in 20 g of dipropylene glycol were respectively prepared.

The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance ($^1$H-NMR) method.

The obtained reaction solution was heated to 70° C., 12.0 g of dimethylethanolamine was added thereto, propylene glycol was added thereto, and the resulting solution was stirred, thereby obtaining a 30 mass % solution of the pigment dispersing resin 1.

The structural unit of the obtained pigment dispersing resin 1 was confirmed by $^1$H-NMR. Further, the weight-average molecular weight (Mw) determined by GPC was 28000.

Further, the mass ratio of respective structural units in the pigment dispersing resin 1 (structural unit derived from stearyl methacrylate/structural unit derived from benzyl methacrylate/structural unit derived from hydroxyethyl methacrylate/structural unit derived from methacrylic acid) was 14/35.3/20/30.7. Here, the mass ratio does not include the mass of dimethylaminoethanol.

The acid value of the pigment dispersing resin 1 was 200 mgKOH/g.

Preparation of Pigment Dispersion Liquid 1

A pigment dispersion liquid 1 was prepared using a Lady Mill model LSG-4U-08 (manufactured by AIMEX Co., Ltd.).

45 parts by mass of titanium dioxide particles (trade name, "PF-690", average primary particle diameter: 210 nm, manufactured by Ishihara Sangyo Kaisha, Ltd.) serving as a white pigment, 15 parts by mass of a 30 mass % solution of the pigment dispersing resin 1, and 40 parts by mass of ultrapure water were added to a zirconia container. Further, 40 parts by mass of 0.5 mmφ zirconia beads (Torayceram beads, manufactured by Toray Industries, Inc.) were added thereto, and the mixture was mixed gently using a spatula. The zirconia container having the obtained mixture was put into a Lady mill and dispersed at a rotation speed of 1000 rpm (revolutions per minute) for 5 hours. After completion of the dispersion, the beads were removed by filtration with a filter cloth, thereby obtaining a pigment dispersion liquid 1 having a white pigment concentration of 45% by mass.

Preparation of White Ink

A white ink having the following composition was prepared using the pigment dispersion liquid 1 and components other than the pigment dispersing resin 1 and the white pigment among the following components.

—Composition of White Ink—
  White pigment: 15% by mass
  Pigment dispersing resin 1: 1.5% by mass
  1,2-Propanediol (PG): 20% by mass
  Propylene glycol monomethyl ether (PGmME): 1% by mass
  Propylene glycol monopropyl ether (PGmPE): 1% by mass
  SURFYNOL 104 (manufactured by Nissin Chemical Industry Co., Ltd., acetylene glycol-based surfactant): 1% by mass
  BYK-345 (manufactured by BYK Chemie GmbH, silicone-based surfactant): 1% by mass
  PVP K-15 (manufactured by Ashland, polyvinylpyrrolidone): 0.1% by mass
  SNOWTEX XS (manufactured by Nissan Chemical Corporation, colloidal silica): 0.05% by mass in terms of solid content
  PERMARIN UA-368 (manufactured by Sanyo Chemical Industries, Ltd., polycarbonate-based polyurethane resin emulsion): 4% by mass in terms of solid content
  Water: remaining amount set such that total amount of composition reached 100% by mass <Image Recording>

Image recording was performed using the pretreatment liquid and the white ink.

An ink jet recording device including a transport system for continuously transporting a long base material, a wire bar coater for coating the base material with the pretreatment liquid, and an ink jet head for applying the ink was prepared.

Further, a polyethylene terephthalate (PET) base material ("FE2001", manufactured by Futamura Chemical Co., Ltd., (thickness of 12 m, width of 780 mm, length of 4000 m), hereinafter, referred to as "impermeable base material A") serving as an impermeable base material was prepared as the base material.

The impermeable base material A was coated with the pretreatment liquid using a wire bar coater such that the amount of the pretreatment liquid to be applied reached approximately 1.7 g/m², and the pretreatment liquid was dried at 50° C. for 2 seconds.

The white ink was jetted from the ink jet head and applied in the form of a solid image to the surface of the impermeable base material A, which had been coated with the pretreatment liquid, while the impermeable base material A was continuously transported at 50 m/min using the ink jet recording device. A solid image was recorded by drying the applied white ink with warm air at 80° C. for 30 seconds, thereby obtaining an image recorded material.

—Ink Application Conditions—
  Ink jet head: 1200 dpi/30 inch-width piezo full line head
  Amount of ink jetted from ink jet head: 3.0 picoliters (pL)
  Driving frequency: 41 kHz (transportation speed of base material: 50 m/min)

[Evaluation]

The storage stability of the pretreatment liquid and the boiling resistance of the image recorded material were evaluated.

The evaluation method is as follows.
The evaluation results are listed in Table 1.

(Storage Stability of Pretreatment Liquid)

The viscosity of the pretreatment liquid that was allowed to stand at 25° C. for 1 hour after the preparation of the pretreatment liquid (hereinafter, referred to as "viscosity before storage") and the viscosity of the pretreatment liquid that was stored in a sealed state at 60° C. for 14 days after the preparation of the pretreatment liquid (hereinafter, referred to as "viscosity after storage") were respectively measured.

Both the viscosity before storage and the viscosity after storage were measured under conditions of 25° C. at 100 revolutions per minute (rpm) using VISCOMETER TV-22 (manufactured by TOKI SANGYO CO., LTD).

Here, the sealed state indicates a state in which the contents are sealed in a container and the amount of decrease in the mass of the contents is less than 1% by mass in a case where the contents are stored under the conditions of 50° C. for 14 days.

A value obtained by subtracting the viscosity before storage from the viscosity after storage was calculated as a degree of an increase in viscosity.

As the degree of an increase in viscosity decreases, the storage stability is excellent.

The evaluation standards are as follows.

—Evaluation Standards for Storage Stability of Pretreatment Liquid—
  5: The degree of an increase in viscosity was less than 0.3 mPa·s.
  4: The degree of an increase in viscosity was 0.3 mPa·s or greater and less than 0.5 mPa·s.
  3: The degree of an increase in viscosity was 0.5 mPa·s or greater and less than 1.0 mPa·s.
  2: The degree of an increase in viscosity was 1.0 mPa·s or greater and less than 2.0 mPa·s.
  1: The degree of an increase in viscosity was 2.0 mPa·s or greater.

(Boiling Resistance of Laminate)

The solid image of the image recorded material was coated with an adhesive for dry lamination (main agent TM-320 (isocyanate)/curing agent CAT-13B (alcohol compound), manufactured by TOYO Morton) using a dry laminating machine (product name, "FL2", manufactured by FUJI KIKAI KOGYO Co., Ltd.), and a linear low-density polyethylene film (trade name, "LL-XMTN", manufactured by FUTAMURA CHEMICAL CO., LTD., thickness of 40 m) was laminated thereon as a base material for lamination. The base material for lamination and the image recorded material were bonded to each other in this state, thereby obtaining a laminate.

The obtained laminate was aged at 40° C. for 48 hours.

Two sheets of sample pieces having a length of 200 mm and a width of 200 mm were cut out from the aged laminate. The cut-out sample pieces were overlapped with each other and three sides thereof were heat-sealed to form a bag. The bag was filled with pure water and sealed by heat sealing.

The sealed bag was placed in an autoclave for retort food (small sterilizer) (product name, "SR-240", manufactured by Tomy Seiko Co., Ltd.) and subjected to a boiling treatment at 95° C. for 40 minutes.

The bag was taken out after the boiling treatment, and the state of the bag was visually observed. Specifically, the boiling resistance was evaluated based on the presence or absence of deformation and laminate floating of the bag.

The evaluation standards are as follows.

The laminate floating is a state in which the image or the base material for lamination is peeled off and thus floating occurs.

—Evaluation Standards for Boiling Resistance of Laminate—
  5: Deformation and laminate floating were not observed.
  4: Laminate floating was not found, but deformation was confirmed.

3: Laminate floating was confirmed at one site.
2: Laminate floating was confirmed at a plurality of sites.
1: Laminate floating was confirmed on the entire surface of the sample piece.

Examples 2 to 21 and Comparative Examples 1 to 3

The same operations as in Example 1 were performed except that at least one of the kind of the aggregating agent in the pretreatment liquid, the presence or absence of the aggregating agent in the pretreatment liquid, or the composition (structural unit) of the urethane resin particles was changed as listed in Table 1.

The results are listed in Table 2.

Here, the kind of each unit in the urethane resin particles, and the kind and content of the polyalkylene glycol monoalkyl ether unit were changed by changing the composition of monomers used in the production of the urethane resin particles.

The molecular weight of the urethane resin in the urethane resin particles was changed by changing the reaction time.

The abbreviations in Table 1 have the following meanings.

Ca acetate: calcium acetate
Al sulfate: aluminum sulfate
TC-310: "ORGATIX TC-310" (manufactured by Matsumoto Fine Chemical Co., Ltd., titanium lactate)
IPDI: isophorone diisocyanate
HDI: hexamethylene diisocyanate
PCD: polycarbonate diol (trade name, DURANOL T5652, manufactured by Asahi Kasei Corporation, molecular weight of 2000)
PTMG: polytetramethylene glycol (trade name, PTMG 1000, manufactured by Mitsubishi Chemical Corporation, molecular weight of 1000)
P-1100: polyester polyol as reaction product of 3-methyl-1,5-pentanediol and adipic acid (trade name, P-1100, manufactured by KURARAY CO., LTD., molecular weight of 1000)
1,6-HDO: 1,6-hexanediol
PEGmME: polyethylene glycol monomethyl ether Comparative Example 4

The same operations as in Example 1 were performed except that the urethane resin particles in the pretreatment liquid were changed to acrylic resin particles.

The results are listed in Table 1.

A pretreatment liquid of Comparative Example 4 was prepared using MOVINYL 972 (manufactured by Japan Coating Resin Co., Ltd.), which is an aqueous dispersion liquid of acrylic resin particles.

Comparative Example 5

The same operations as in Example 1 were performed except that the pretreatment liquid did not contain the urethane resin particles.

The results are listed in Table 1.

TABLE 1

| | Pretreatment liquid | | | | | | | | | |
|---|---|---|---|---|---|---|---|---|---|---|
| | Urethane resin particles or comparative resin particles | | | | | | | | Evaluation result | |
| | | | | Polyalkylene glycol monoalkyl ether unit | | | | | | |
| | Aggregating agent | Polyisocyanate unit | Polyol unit | Type | Molecular weight (a) | Content (mass %) | Molecular weight (b) | (a/b) × 100 | Storage stability | Boiling resistance |
| Example 1 | Glutaric acid | IPDI | PCD | PEGmME | 550 | 10% | 29000 | 1.9 | 4 | 4 |
| Example 2 | Glutaric acid | IPDI | PCD | PEGmME | 750 | 10% | 30000 | 2.5 | 5 | 5 |
| Example 3 | Glutaric acid | IPDI | PCD | PEGmME | 1000 | 10% | 31000 | 3.2 | 5 | 5 |
| Example 4 | Glutaric acid | IPDI | PCD | PEGmME | 2000 | 10% | 33000 | 6.1 | 5 | 5 |
| Example 5 | Glutaric acid | IPDI | PCD | PEGmME | 4000 | 10% | 32000 | 12.5 | 5 | 5 |
| Example 6 | Glutaric acid | IPDI | PCD | PEGmME | 5000 | 10% | 32000 | 15.6 | 5 | 5 |
| Example 7 | Glutaric acid | IPDI | PCD | PEGmME | 10000 | 10% | 34000 | 29.4 | 4 | 4 |
| Example 8 | Glutaric acid | IPDI | PCD | PEGmME | 1000 | 10% | 4400 | 22.7 | 4 | 4 |
| Example 9 | Glutaric acid | IPDI | PCD | PEGmME | 1000 | 10% | 14000 | 7.1 | 5 | 5 |
| Example 10 | Glutaric acid | IPDI | PCD | PEGmME | 1000 | 10% | 22000 | 4.5 | 5 | 5 |
| Example 11 | Glutaric acid | IPDI | PCD | PEGmME | 1000 | 10% | 45000 | 2.2 | 4 | 4 |
| Example 12 | Glutaric acid | IPDI | PCD | PEGmME | 1000 | 2.5% | 32000 | 3.1 | 3 | 4 |
| Example 13 | Glutaric acid | IPDI | PCD | PEGmME | 1000 | 5% | 31000 | 3.2 | 5 | 5 |
| Example 14 | Glutaric acid | IPDI | PCD | PEGmME | 1000 | 20% | 31000 | 3.2 | 5 | 5 |
| Example 15 | Glutaric acid | IPDI | PCD | PEGmME | 1000 | 30% | 32000 | 3.1 | 5 | 4 |
| Example 16 | Ca acetate | IPDI | PCD | PEGmME | 1000 | 10% | 31000 | 3.2 | 5 | 4 |
| Example 17 | Al sulfate | IPDI | PCD | PEGmME | 1000 | 10% | 31000 | 3.2 | 5 | 3 |
| Example 18 | TC-310 | IPDI | PCD | PEGmME | 1000 | 10% | 31000 | 3.2 | 5 | 3 |
| Example 19 | Glutaric acid | HDI | PCD | PEGmME | 1000 | 10% | 31000 | 3.2 | 5 | 5 |
| Example 20 | Glutaric acid | IPDI | PTMG | PEGmME | 1000 | 10% | 36000 | 2.8 | 5 | 4 |
| Example 21 | Glutaric acid | IPDI | P-1100 | PEGmME | 1000 | 10% | 35000 | 2.9 | 5 | 4 |
| Comparative Example 1 | Glutaric acid | IPDI | PCD | None | — | — | 30000 | — | 1 | 2 |
| Comparative Example 2 | None | HDI | 1,6-HDO | PEGmME | 1000 | 10% | 29000 | 3.4 | 5 | 1 |
| Comparative Example 3 | None | IPDI | PCD | PEGmME | 550 | 10% | 29000 | 1.9 | 5 | 1 |
| Comparative Example 4 | Glutaric acid | Acrylic resin particles | | | | | 98000 | — | 5 | 1 |
| Comparative Example 5 | Glutaric acid | Resin particles were not available | | | | | — | — | 5 | 1 |

As listed in Table 1, in each example in which the pretreatment liquid containing an aggregating agent and a urethane resin having a polyalkylene glycol monoalkyl ether unit was used, the storage stability of the pretreatment liquid was excellent, and the boiling resistance of the laminate was excellent.

On the contrary, in Comparative Example 1 in which the urethane resin in the pretreatment liquid did not have a polyalkylene glycol monoalkyl ether unit, the storage stability of the pretreatment liquid and the boiling resistance of the laminate were degraded.

In Comparative Examples 2 and 3 in which the pretreatment liquid did not contain an aggregating agent, Comparative Example 4 in which the pretreatment liquid contained an acrylic resin in place of a urethane resin, and Comparative Example 5 in which the pretreatment liquid did not contain a urethane resin, the boiling resistances of all the laminates were degraded.

As shown in the results of Examples 1 to 8, it was found that in a case where the weight-average molecular weight of the polyalkylene glycol monoalkyl ether unit was defined as a and the weight-average molecular weight of the urethane resin was denoted as b and (a/b)×100 was in a range of 2.5 to 20.0 (Examples 2 to 6), the boiling resistance of the laminate was further improved.

As shown in the results of Examples 12 to 15, it was found that in a case where the content of the polyalkylene glycol monoalkyl ether unit was in a range of 5% by mass to 20% by mass with respect to the total amount of the urethane resin (Examples 13 and 14), the boiling resistance of the laminate was further improved.

As shown in the results of Examples 19 to 21, it was found that in a case where the polyol unit in the urethane resin included a polycarbonate diol unit (Example 19), the boiling resistance of the laminate was further improved.

As shown in the results of Examples 3 and 16 to 18, it was found that in a case where the aggregating agent includes at least one selected from the group consisting of an organic acid polyvalent metal salt and an organic acid (Examples 3 and 16), the boiling resistance of the laminate was further improved.

As shown in the results of Examples 3 and 16, it was found that in a case where the aggregating agent included an organic acid (Example 3), the boiling resistance of the laminate was further improved.

[Example 101] (Evaluation of Multicolor Image)

Preparation of Colored Ink

Colored inks (specifically, a cyan ink, a magenta ink, a yellow ink, and a black ink) with the compositions listed in Table 2 were prepared.

TABLE 2

|  | Cyan ink | Magenta ink | Yellow ink | Black ink |
| --- | --- | --- | --- | --- |
| APD4000C (Solid content) | 3 | | | |
| APD4000M (Solid content) | | 4 | | |
| APD1000R (Solid content) | | 2 | | |
| APD4000Y (Solid content) | | | 4 | |

TABLE 2-continued

|  | Cyan ink | Magenta ink | Yellow ink | Black ink |
| --- | --- | --- | --- | --- |
| APD4000K (Solid content) | | | | 4 |
| PG | 25 | 25 | 25 | 25 |
| PGmME | 3 | 3 | 3 | 3 |
| PGmPE | 1 | 1 | 1 | 1 |
| SURFYNOL 104 | 1 | 1 | 1 | 1 |
| BYK-345 | 1 | 1 | 1 | 1 |
| PVP K-15 | 0.1 | 0.1 | 0.1 | 0.1 |
| SNOWTEX XS | 0.05 | 0.05 | 0.05 | 0.05 |
| PERMARIN UA-368 | 6 | 3 | 3 | 3 |
| Water | Remaining amount | Remaining amount | Remaining amount | Remaining amount |

In Table 2, the numerical value of each component denotes the content (% by mass) of the component in the corresponding ink, and "remaining amount" which is the amount of water denotes the remaining amount set such that the total amount of the composition reaches 100% by mass.

In Table 2, the details of the components listed below PG (1,2-propanediol) are the same as the details of the components of the white ink described above.

APD4000C and the like in Table 2 are pigment dispersion liquids, and the details thereof are as follows.

In Table 2, the amount of the pigment dispersion liquid denotes the amount of the solid content (total amount of the pigment and the pigment dispersing agent).

APD4000C: Projet Cyan APD4000 (manufactured by FUJIFILM Imaging Colorants Inc., cyan pigment dispersion liquid, pigment concentration: 20% by mass)

APD4000M: Projet Magenta APD4000 (manufactured by FUJIFILM Imaging Colorants Inc., magenta pigment dispersion liquid, pigment concentration: 20% by mass)

APD1000R: Projet Red APD1000 (manufactured by FUJIFILM Imaging Colorants Inc., red pigment dispersion liquid, pigment concentration: 16% by mass)

APD4000Y: Projet Yellow APD4000 (manufactured by FUJIFILM Imaging Colorants Inc., yellow pigment dispersion liquid, pigment concentration: 20% by mass)

APD4000K: Projet Black APD4000 (manufactured by FUJIFILM Imaging Colorants Inc., black pigment dispersion liquid, pigment concentration: 15% by mass)

<Image Recording>

Image recording was performed using the pretreatment liquid of any one of Examples 1 to 21 and Comparative Examples 1 to 5, the white ink of Example 1, and the colored inks listed in Table 2 (specifically, the cyan ink, the magenta ink, the yellow ink, and the black ink).

Specifically, each of the following image recording A to image recording D was performed to obtain a solid image.

In the following image recording A to image recording D, the conditions for applying the pretreatment liquid, the conditions for drying the applied pretreatment liquid, the conditions for applying the ink, and the conditions for drying the applied ink were set to the same as those in the image recording of Example 1.

Image recording A: image recording performed in order of application of the pretreatment liquid, drying, application of the cyan ink, application of the white ink, and drying Image recording B: image recording performed in order of application of the pretreatment liquid, drying, application of the cyan ink, application of the magenta ink, application of the yellow ink, application of the black ink, application of the white ink, and drying Image recording C: image recording performed in order of application of the pretreatment liquid, drying, application of the cyan ink, drying, application of the white ink, and drying Image recording D: image recording performed in order of application of the pretreatment liquid, drying, application of the cyan ink, application of the magenta ink, application of the yellow ink, application of the black ink, drying, application of the white ink, and drying The preparation of the laminate and the evaluation of the boiling resistance of the laminate were performed in the same manners as in Example 1 using each image recorded material obtained in the image recording A to the image recording D.

As a result, it was confirmed that in a case where the pretreatment liquids of Examples 1 to 21 were used, the boiling resistance of the laminate was excellent similarly to Examples 1 to 21 (that is, image recording performed with the single white ink) even in a case where any of the image recording A to the image recording D was performed.

The disclosure of JP2022-020630 filed on Feb. 14, 2022 is incorporated herein by reference in its entirety.

All documents, patent applications, and technical standards described in the present specification are incorporated herein by reference to the same extent as in a case of being specifically and individually noted that individual documents, patent applications, and technical standards are incorporated by reference.

What is claimed is:

1. A pretreatment liquid for an ink jet ink, comprising:
at least one aggregating agent selected from the group consisting of an organic acid, a polyvalent metal compound, and a metal complex;
water; and
a urethane resin,
wherein the urethane resin has a polyol unit, a polyisocyanate unit, and a polyalkylene glycol monoalkyl ether unit, and
wherein in a case where a number average molecular weight of polyalkylene glycol monoalkyl ether for forming the polyalkylene glycol monoalkyl ether unit is defined as a and a number average molecular weight of the urethane resin is defined as b, (a/b)×100 is in a range of from 2.5 to 15.6.

2. The pretreatment liquid for an ink jet ink according to claim 1,
wherein a content of the polyalkylene glycol monoalkyl ether unit is in a range of 5% by mass to 20% by mass with respect to a total amount of the urethane resin.

3. The pretreatment liquid for an ink jet ink according to claim 1,
wherein the polyol unit includes a polycarbonate diol unit.

4. The pretreatment liquid for an ink jet ink according to claim 1,
wherein the aggregating agent includes at least one selected from the group consisting of the organic acid and an organic acid polyvalent metal salt as the polyvalent metal compound.

5. The pretreatment liquid for an ink jet ink according to claim 1,
wherein the aggregating agent includes the organic acid.

6. An ink set comprising:
the pretreatment liquid for an ink jet ink according to claim 1; and
a first ink which is an ink jet ink containing water and a urethane resin.

7. The ink set according to claim 6,
wherein the first ink further contains a white pigment.

8. The ink set according to claim 7, further comprising:
a second ink which is an ink jet ink containing water, a color pigment, and a urethane resin.

9. An image recording method using the ink set according to claim 6, the method comprising:
a step of applying the pretreatment liquid for an ink jet ink onto an impermeable base material; and
a step of applying the first ink onto the impermeable base material onto which the pretreatment liquid for an ink jet ink has been applied, using an ink jet recording method.

10. An image recording method using the ink set according to claim 8, the method comprising:
a step of applying the pretreatment liquid for an ink jet ink onto an impermeable base material; and
a step of applying the first ink and the second ink onto the impermeable base material onto which the pretreatment liquid for an ink jet ink has been applied, using an ink jet recording method.

11. A method of producing a laminate, comprising:
a step of obtaining an image recorded material that includes the impermeable base material and an image disposed on the impermeable base material by the image recording method according to claim 9; and
a step of laminating a base material for lamination on a side of the image recorded material where the image is disposed, to obtain a laminate.

12. An image recorded material comprising:
an impermeable base material; and
an image disposed on the impermeable base material,
wherein the image includes a pretreatment layer disposed on the impermeable base material and containing at least one aggregating agent selected from the group consisting of an organic acid, a polyvalent metal compound, and a metal complex, and a urethane resin, and
an ink layer disposed on the pretreatment layer and containing a pigment and a urethane resin, and
the urethane resin in the pretreatment layer includes a polyol unit, a polyisocyanate unit, and a polyalkylene glycol monoalkyl ether unit, wherein in a case where a number average molecular weight of polyalkylene glycol monoalkyl ether for forming the polyalkylene glycol monoalkyl ether unit is defined as a and a number average molecular weight of the urethane resin is defined as b, (a/b) ×100 is in a range of from 2.5 to 15.6.

13. The image recorded material according to claim 12,
wherein a content of the polyalkylene glycol monoalkyl ether unit is in a range of 5% by mass to 20% by mass with respect to a total amount of the urethane resin.

14. The image recorded material according to claim 12,
wherein the polyol unit includes a polycarbonate diol unit.

15. The image recorded material according to claim 12,
wherein the aggregating agent includes at least one selected from the group consisting of the organic acid and an organic acid polyvalent metal salt as the polyvalent metal compound.

16. The image recorded material according to claim 12,
wherein the aggregating agent includes the organic acid.

17. A laminate comprising:
the image recorded material according to claim 12; and
a base material for lamination which is laminated on the image of the image recorded material.

18. The pretreatment liquid for an ink jet ink according to claim 1,
wherein the polyol unit comprises a polycarbonate diol unit, the proportion of the polycarbonate diol unit with respect to the total amount of the polyol unit being from 80% by mass to 100% by mass.

19. A pretreatment liquid for an ink jet ink, comprising:
at least one aggregating agent selected from the group consisting of an organic acid, a polyvalent metal compound, and a metal complex;
water; and
a urethane resin,
wherein the urethane resin has a polyol unit, a polyisocyanate unit, and a polyalkylene glycol monoalkyl ether unit,
a content of the polyalkylene glycol monoalkyl ether unit is in a range of 5% by mass to 20% by mass with respect to a total amount of the urethane resin,
the polyol unit includes a polycarbonate diol unit, and
wherein in a case where a number average molecular weight of polyalkylene glycol monoalkyl ether for forming the polyalkylene glycol monoalkyl ether unit is defined as a and a number average molecular weight of the urethane resin is defined as b, $(a/b) \times 100$ is in a range of 2.5 to 16.

* * * * *